United States Patent [19]
Riley

[11] Patent Number: 5,341,771
[45] Date of Patent: Aug. 30, 1994

[54] INTERNAL COMBUSTION ENGINE WITH VARIABLE COMBUSTION CHAMBERS AND INCREASED EXPANSION CYCLE

[75] Inventor: Michael B. Riley, Fort Collins, Colo.

[73] Assignee: Motive Holdings Limited, Fort Collins, Colo.

[21] Appl. No.: 800,920

[22] Filed: Dec. 3, 1991

[51] Int. Cl.⁵ ............................................ F02B 75/04
[52] U.S. Cl. .............................. 123/48 AA; 123/316
[58] Field of Search ............. 123/48 A, 48 AA, 78 A, 123/78 AA, 316

[56] References Cited

U.S. PATENT DOCUMENTS

| | | | |
|---|---|---|---|
| 1,819,897 | 8/1931 | Johnson | 123/48 A |
| 3,964,452 | 6/1976 | Nakamura et al. | 123/78 AA |
| 4,033,304 | 7/1977 | Luria | 123/48 A |
| 4,187,808 | 2/1980 | Audoux | 123/48 AA |
| 4,232,641 | 11/1980 | Curtil | 123/316 |
| 4,286,552 | 9/1981 | Tsutsumi | 123/48 AA |
| 4,424,790 | 1/1984 | Curtil | 123/90.6 |
| 4,516,537 | 5/1985 | Nakahara et al. | 123/78 AA |
| 4,538,569 | 9/1985 | Sugino et al. | 123/316 |
| 4,539,946 | 9/1985 | Hedelin | 123/316 |
| 4,890,585 | 1/1990 | Hathorn | 123/48 A |
| 4,987,863 | 1/1991 | Daly | 123/48 AA |
| 5,063,883 | 11/1991 | Dingess | 123/48 AA |

FOREIGN PATENT DOCUMENTS

| | | | |
|---|---|---|---|
| 3336523 | 4/1985 | Fed. Rep. of Germany | 123/48 A |
| 0063340 | 4/1984 | Japan | 123/78 A |

Primary Examiner—David A. Okonsky
Attorney, Agent, or Firm—Beaton & Swanson

[57] ABSTRACT

An internal combustion engine and method for operating the same wherein the combustion chamber volume can be varied depending on throttle position by a member that is inserted into the combustion chamber, and wherein the intake valve is closed before the piston completes its intake stroke so that the expansion stroke is effectively lengthened. In the case of a two-stroke engine, some of the intake gas is expelled before combustion to achieve an effective lengthening of the expansion stroke.

33 Claims, 10 Drawing Sheets

Schematic of standard cam profile

Schematic of Atkinson cam profile

INTERNAL COMBUSTION ENGINE WITH VARIABLE COMBUSTION CHAMBERS AND INCREASED EXPANSION CYCLE

FIELD OF THE INVENTION

The present invention relates to an internal combustion engine having a variable volume combustion chamber to optimize fuel-air ignition pressure at a variety of throttle rates, and having a lengthened expansion stroke to increase efficiency.

BACKGROUND OF THE INVENTION

It has long been known that increasing the compression ratio of an internal combustion engine increases its thermodynamic efficiency. The assumption used is that, for ideal cycles, a normally aspirated engine achieves full cylinder filling at atmospheric pressure. In this case the geometric volume ratio (of cylinder plus combustion chamber compared to combustion chamber alone) is designed to give a pre-combustion pressure just below the auto-ignition point of recommended fuels in gasoline engines, at the upper temperature regions of normal operation. For such engines operating at less than full load, however, the pressure of the mixture filling the cylinder is less than atmospheric. Consequently, while the geometric volume ratio remains constant, the pressure ratio is decreased, resulting in a mixture in the combustion chamber whose pressure is below that obtained at full throttle. One approach to restoring the full pre-combustion pressure (or achieving the desired pressure ratio) is to vary the volume of the combustion chamber. Designs to achieve this are numerous, but most lack the simplicity of design, and the robustness, to make their implementation practical. Some of the prior art is summarized below.

U.S. Pat. No. 741,824 by Pehrsson describes a 4-stroke, internal combustion engine with a cam operated exhaust valve and a vacuum operated intake valve, and with a main cylinder-diameter auxiliary piston used to manually vary the combustion chamber volume, to obtain the maximum pre-combustion pressure. The position of the auxiliary piston defines the limits of travel of the inlet valve.

In U.S. Pat. No. 1,167,023 by Schmidt, there is disclosed a conventional 4-stroke engine with an auxiliary cylinder and piston above the main cylinder, to vary the combustion chamber volume. The auxiliary piston position is controlled by a spring, and the load of combustion is taken up by hydraulic pressure. The position of the auxiliary piston is therefore dependent on the load, as the rate of supply and escape of oil from above the auxiliary piston (or the top half of it) is limited by the rate with which it can enter or escape through the oil ports. The outlet port has a valve that has a preset (and alterable) pressure relief system. If the combustion pressure exceeds this pressure, oil is forced out of the pressure chamber, and the auxiliary piston moves towards its outermost position, increasing the combustion chamber volume. When the load setting is decreased, and the combustion pressure is less than this value, oil is not released from the outlet, but still enters through the inlet check valve, resulting in the movement of the piston towards the main cylinder, and increasing the pre-combustion pressure.

Wilson discloses in U.S. Pat. No. 1,639,477 a conventional 4-stroke engine with an auxiliary cylinder and multiple crowned piston located above the working piston. The position of the auxiliary piston is controlled by the pressure in the intake manifold, via a second auxiliary piston, operated upon by hydraulic pressure. A spring is used to move the auxiliary piston to its outermost position when the engine is not running.

In U.S. Pat. No. 2,142,466 by Wagner a conventional 4-stroke compression ignition engine is described, with a throttled intake system and a variable volume combustion chamber. The auxiliary piston reciprocates, driven by the camshaft, whose timing is variable angularly.

In U.S. Pat. No. 2,344,993 by Lysholm there is disclosed a conventional 4-stroke spark or compression ignition engine with closure of the intake valve during the intake stroke, executing the Atkinson cycle. As the piston speed is high during valve closure, at high engine speeds the volumetric efficiency of the engine is reduced. If the intake valve were to be closed on the compression stroke instead, then the volumetric efficiency at high engine speeds would be increased, necessitating reducing it at low speeds. By closing the intake valve later on the induction stroke, and opening it very briefly on the compression stroke, the patent claims to produce a nearly constant volumetric efficiency, or that almost any desired curve of volumetric efficiency with engine speed can be tailored. On the compression ignition engine, the valve opening on the compression stroke can be the exhaust valve, as the fuel has not been injected as yet. The patent indicates that this is most suited to supercharged engines, thus in effect raising the efficiency to levels at or slightly above non-forced induction engines.

In U.S. Pat. No. 2,467,568 by Rosaen there is disclosed a conventional 4-stroke engine with a variable volume combustion chamber, controlled by hydraulic pressure. It appears that the auxiliary piston is filled with oil.

Humphreys discloses in U.S. Pat. No. 2,769,433 a conventional 2-stroke or 4-stroke engine with an auxiliary cylinder and piston located above the working piston. The auxiliary piston is backed by hydraulic fluid supplied by the engine's lubrication system. Oil can escape from the chamber at the back of the auxiliary piston if the maximum pressure achieved during combustion exceeds a preset value, which is enforced on the escape mechanism.

Heisling discloses in U.S. Pat. No. 2,883,974 a conventional 4-stroke engine with an auxiliary cylinder and piston located above the working piston, whose purpose is to provide a variable volume combustion chamber. The position of the auxiliary piston is controlled by hydraulic pressure, and it is also actuated by hydraulic pressure. A second embodiment utilizes a moving cylinder sleeve. Much of the emphasis of the invention is on the control mechanism to make the idea work.

In U.S. Pat. No. 3,964,452 by Nakamura an auxiliary cylinder and piston are located above a main cylinder and piston, and may communicate with them. A spring loaded piston may slide in the auxiliary cylinder, and does so after a certain preset high pressure is achieved during combustion. The primary purpose is to limit pressures and temperatures during combustion, and therefore increase thermal efficiency while ensuring that production of $NO_x$ is limited. Lean charges lead to reduced CO and HC emissions, but they may also produce misfires and combustion fluctuations.

In U.S. Pat. No. 4,033,304 by Luria there is described an internal combustion engine that achieves constant pre-combustion pressure with a movable auxiliary piston and cylinder, wherein said piston is controlled by hydraulic means. The invention implements the Atkinson cycle with variable inlet valve timing. The inlet valve is held open past bottom dead center ("BDC") to vent the unwanted mixture back into the inlet tract. The auxiliary piston is spring loaded so that during the exhaust stroke, the auxiliary cylinder volume is at its least, thereby aiding scavenging.

In U.S. Pat. No. 4,187,808 by Audoux there is disclosed a conventional 4-stroke engine, with an auxiliary piston and cylinder located above the main piston. The focus is on the hydraulic valving used to reduce any loads on the mechanical actuation of the auxiliary piston. With lowered pressure in the main cylinder, the auxiliary piston is designed to move inward towards the main cylinder, decreasing the volume of the combustion chamber, and assisting in scavenging burnt gases.

U.S. Pat. No. 4,516,537 by Nakahara discloses a conventional 4-stroke engine with an auxiliary cylinder and piston located in the head above the main piston and cylinder. The auxiliary piston is moved by hydraulic fluid under pressure. A major thrust of the invention is to construct a feasible means of controlling the auxiliary piston position, without having the excessive pressures from combustion having an impact on the oil pressure system, yet to distribute the load uniformly.

U.S. Pat. No. 4,798,184 by Palko discloses a 2-stroke or 4-stroke diesel engine where the intake valve is closed on the compression stroke to implement a greater expansion duration than compression. The valve actuation means is not described in any detail, and the patent indicates that it may be fixed or it may be variable during operation. The extended expansion allows combustion to occur at or after top dead center ("TDC"), reducing engine loads, and heat losses to the cooling system. The usual advantages to the expansion increase are more work produced by the expanding gases, and lower exhaust temperatures.

The prior art approaches for varying the volume of the combustion chambers can be placed into four main categories, each of which has advantages and disadvantages:
(1) Move the centerline of the crankshaft relative to the line running parallel with the center of the head. This has the advantage that the conventional combustion chamber shape and volume can be used. The disadvantage is that the system must be complex to control accurate relative movement of the crankshaft and its crankcase, and the remainder of the engine. Sealing such a mechanism against oil leakage is difficult. The design may cause problems with V-shaped engine blocks, and will not work with rotary or orbital engine designs.
(2) Split the connecting rod so that its length can be varied. There are two main variants of this idea: one is to hydraulically control the length, which is adjusted only with varying throttle settings, and the other is to provide a spring between the two portions of the connecting rod. Both increase the reciprocating mass of the engine, and make balancing of components more difficult. The sprung connecting rod exacerbates the balance problems, leading to considerable vibration in the engine. The advantage of such a design is the same as for (1). This will not work with rotary or orbital engines.
(3) Split the piston, much like the connecting rod, so that the distance from the center of the crankshaft to the piston crown may vary. This has the same problems as the split connecting rod, and the same advantage.
(4) Provide a means of varying the shape of the combustion chamber, and leave the piston, connecting rod and crankshaft the same as in a conventional engine. The means of varying the volume include an auxiliary cylinder and piston, or a flexible diaphragm. The disadvantage of the diaphragm is that work hardening may occur of the flexible material, leading to failure that will prevent the engine from working correctly. The auxiliary cylinder and piston has several forms. These include straight mechanical actuation (regardless of the means of sensing the correct position), hydraulic actuation that also acts to absorb combustion pressures, and mechanical/electrical actuation, with hydraulic shock absorption. Of the three types cited, the last one provides the most accurate means of positioning, and achieves (along with the second means) suitable protection of the mechanism from the forces experienced during combustion.

SUMMARY OF THE INVENTION

The present invention is a system for increasing engine efficiency by varying the combustion chamber volume and allowing for greater expansion of combustion products. The invention accomplishes this while meeting a number of important operating parameters, including:
(1) Combustion forces on the face of the auxiliary piston do not cause damage or significant wear to the actuation mechanism.
(2) The auxiliary piston can be withdrawn, to give the maximum combustion chamber volume, in the event of the ignition being switched off, the engine not running, or failure of the control mechanism.
(3) Withdrawal of the auxiliary piston can be achievable in the same period of time that the operator of such an engine can alter the load setting from idle to full load.
(4) Input information for the determination of the position of the auxiliary piston can be readily available from the sensors used to control fuel injection.
(5) In the case of hydraulic actuation, the fluid supply has a check valve to prevent the high combustion chamber pressures from affecting the remainder of the fluid system (be it engine oil or a separate supply).
(6) There is a cushion of oil trapped between the auxiliary piston and the cylinder when the piston is retracted to its uppermost position. This will prevent collision of the piston and cylinder.
(7) The back side of the auxiliary piston is cooled. This is achieved by continuous circulation of lubricating oil in the chamber between the piston and its cylinder.
(8) Under constant load, oil can discharge through a long orifice, in such a way that the combustion pressures subside before there is immoveable contact between the auxiliary piston and the positioning rod.
(9) Such a long orifice can be located at the highest point within the auxiliary cylinder, so that any bypass gases may be vented.
(10) There is a stop at the end of the auxiliary cylinder facing the working cylinder, to prevent the auxiliary piston from entering the working cylinder, in the event of failure.

Such a design is simple, and contains the minimum of moving parts. An auxiliary piston moves in and out of the combustion chamber through the cylinder head in response to varying load settings and engine conditions. There is a cavity behind the auxiliary piston filled with an hydraulic fluid. It is preferable, though not essential, that the hydraulic fluid used to cushion the combustion forces be engine oil, supplied by the lubrication pump (given that almost all vehicles use plain bearings, lubricated under pressure). The fluid fulfills three purposes: it protects the actuation mechanism (if it is not the fluid itself) from the forces of combustion, it acts to cool the auxiliary piston, and it provides lubrication for the auxiliary piston. The purpose of retracting the auxiliary piston when the engine off is to minimize the pressure work required to start the engine. There is a continuous supply of oil into the chamber, with a continuous leakage out as well. A screw thread arrangement is used to position the auxiliary piston with a shank small enough to limit the force transmitted from combustion. There is a spring located between the end of the actuating bolt and the piston. This spring has a very limited range of travel, so that the forces produced by combustion are taken up trying to force a volume of oil through the exit bleed hole. For the scenario that the load is altered from idle to full power in a very short time, there is a safety valve that can be actuated by the same motor that controls the up and down movement of the piston. This is capable of opening up a larger exit port in the auxiliary cylinder, so that the actuating motor need not expend energy pumping oil as well as moving the piston.

In addition, the intake valve timing is altered so that the valve closes on the intake stroke before the piston completes its downward travel. Therefore, in the power stroke combusted gases are able to expand more completely so that a greater amount of work is recovered.

DETAILED DESCRIPTION OF THE INVENTION

Figure 1:
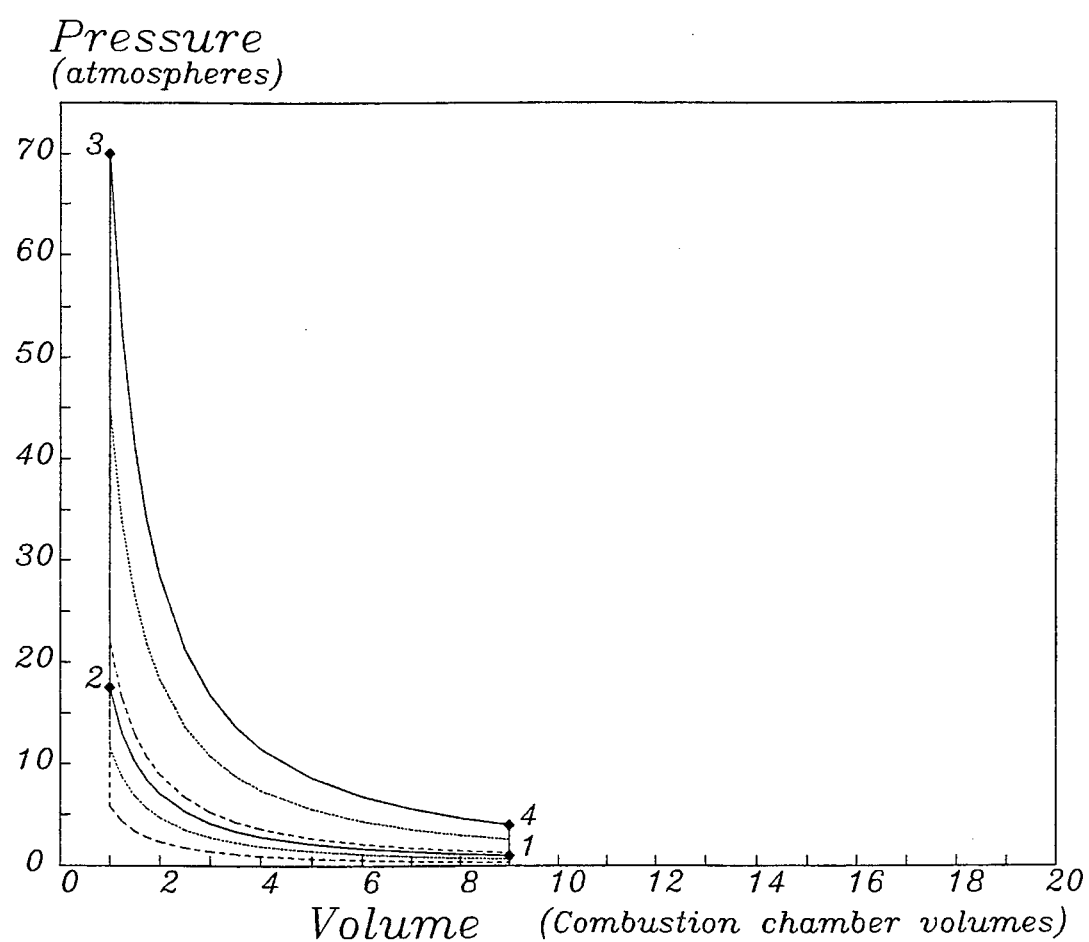
FIG. 1 is a pressure-volume graph for the fuel-air cycle of a conventional spark ignition, internal combustion engine.

FIG. 1 shows a pressure-volume diagram for an idealized fuel-air cycle for a conventional engine. It is for a 4-stroke, spark ignition engine. The compression ratio shown here is 9:1, which is typical for today's normally aspirated automobile engines. The three curves shown are for full load operation, half load and idle. The abscissa shows volume in multiples of an unmodified combustion chamber volume. The ordinate shows pressure in atmospheres. Point 1 in FIG. 1 is the start of the compression stroke for full load operation (the solid line). The combustible mixture is at one atmosphere pressure, and the volume is nine times the volume of the combustion chamber. In the ideal cycle, compression occurs isentropically from point 1 to point 2. At point 2 the pressure is approximately 17.4 atmospheres, with a volume 1/9 that at point 1. Combustion occurs adiabatically and at constant volume, and the pressure rises to approximately 70 atmospheres, to point 3. Isentropic expansion then occurs from point 3 to point 4. At this point, the exhaust process commences (at a cylinder pressure of approximately 4.0 atmospheres), and the pressure drops to one atmosphere. (In a real engine, the exhaust and induction processes occur close to one atmosphere, and are not shown in FIG. 1.)

The area enclosed by points 1-2-3-4-1 represents the (ideal) release of energy from the combustion of fuel. The amount available for useful work in a real engine will be less than this, due to friction, heat losses, time losses, exhaust blowdown and incomplete combustion. The magnitudes of these losses will not be discussed here.

The more densely dotted curve represents the idealized half load cycle. The initial pressure of the combustible mixture is approximately 0.7 of an atmosphere, and its temperature will be slightly lower than for the full load case. Isentropic compression raises the pressure and temperature to values below those of the full load cycle. (The pressure is approximately 12 atmospheres at the end of the compression stroke.) The combustion process results in a lower pressure and temperature than those values reached in the full load cycle. The peak pressure is approximately 45 atmospheres. Isentropic expansion then occurs, reducing the pressure to approximately 2.6 atmospheres. The exhaust process occurs at approximately one atmosphere, and the induction process at 0.7 atmosphere. The area enclosed by this curve is approximately 65% of that at full load.

The less densely dotted curve represents the idealized idle cycle. The pre-combustion pressure in this cycle is 5.8 atmospheres, and the pressure after combustion is 22 atmospheres. After expansion, the pressure is 1.3 atmospheres. The induction process takes place at approximately 0.3 atmospheres. The area enclosed by this curve is approximately 30% of that at full load. Further, the efficiency with which an engine converts the chemical energy of fuel to useful mechanical work in an engine at idle is zero. Consequently, the area of idle curve may be thought of as a crude estimate of the losses in a real engine. (If the area of the idle curve were subtracted from both the full and half load curves, the area enclosed by the half load curve would be 50% that of the full load curve.)

There are two ways to increase the thermodynamic efficiency of the standard cycle. The first is to ensure that the pre-combustion pressure is always at the highest pressure short of auto-ignition prior to spark ignition. This is the desired pressure that is achieved in the standard combustion chamber at full load, for a given volumetric compression ratio. (This implies that there will be no increase in efficiency at full load.) The second is to allow the burned gases to expand further than in the standard cycle. This is known as the Atkinson cycle.

Figure 2A:
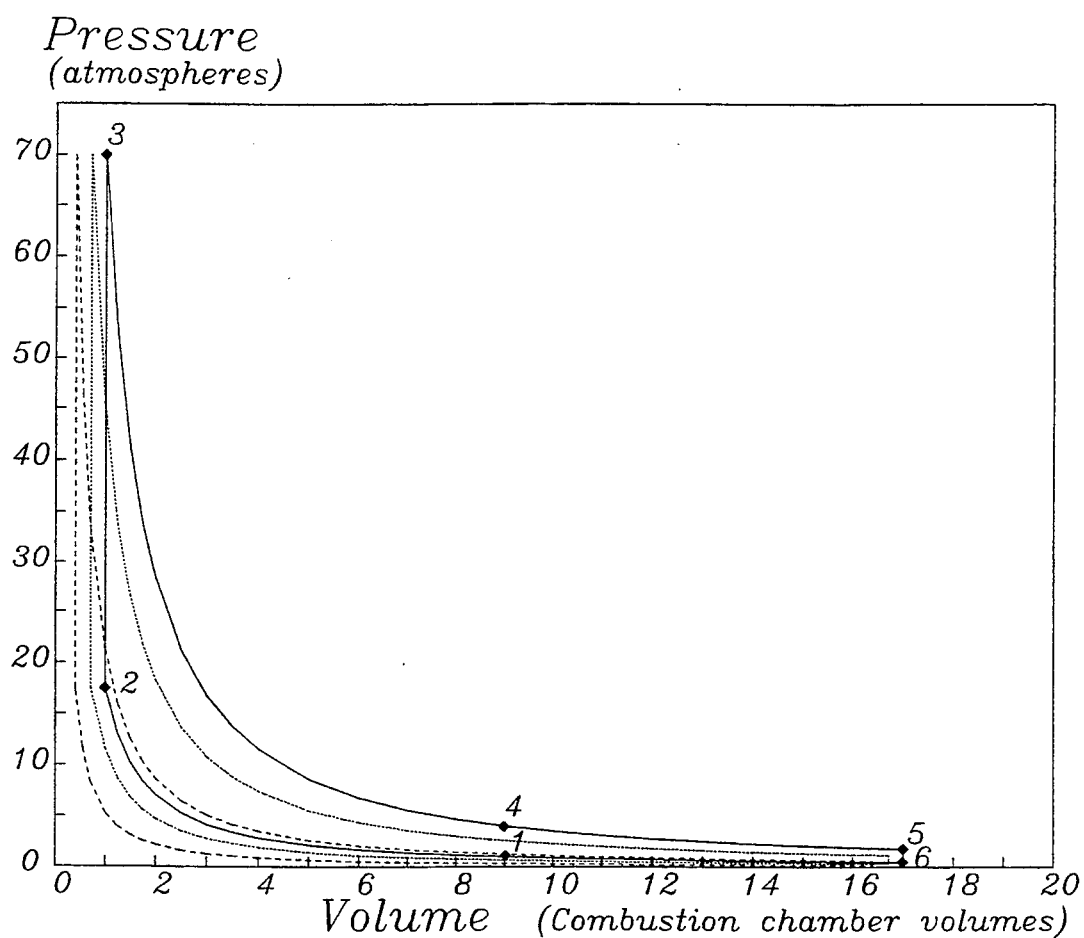
FIG. 2a is a pressure-volume graph showing the effect of the present invention.

FIG. 2a shows the effect on the pressure-volume diagram of incorporating these two concepts. The same three load levels are shown as in FIG. 1. At less than full load, the combustion chamber volume is decreased to bring the pre-combustion mixture up to its desired pressure, for the given engine conditions. The reduction in volume is evident as the half load and idle curves are displaced to the left of the full load curve.

At all load levels, the expansion stroke extends to a volume beyond the standard stroke. In FIGS. 2a, 2b, 2c and 2d, the expansion stroke is shown as twice that of the standard cycle. (The ratio for expansion to compression may vary from 1:1, the standard cycle, to 3:1.) Using the standard definition of compression ratio (total volume to that of the combustion chamber), said ratio is shown as 17:1 here. In FIG. 2a expansion is shown as taking place from point 3 to 4 to 5 for full load operation. The intake stroke (not shown) occurs with the intake valve being open for only half of the stroke length. Thus, at half stroke, upon closure of the intake valve, the combustible mixture is expanded isentropically to the end of the stroke, which is point 6 in FIG. 2a. The work expended in this isentropic expansion is recovered on the compression stroke, by the time the piston reaches the same location as valve closure occurred on the intake stroke, shown as point 1. Compression then proceeds as usual to point 2.

Figure 2B:
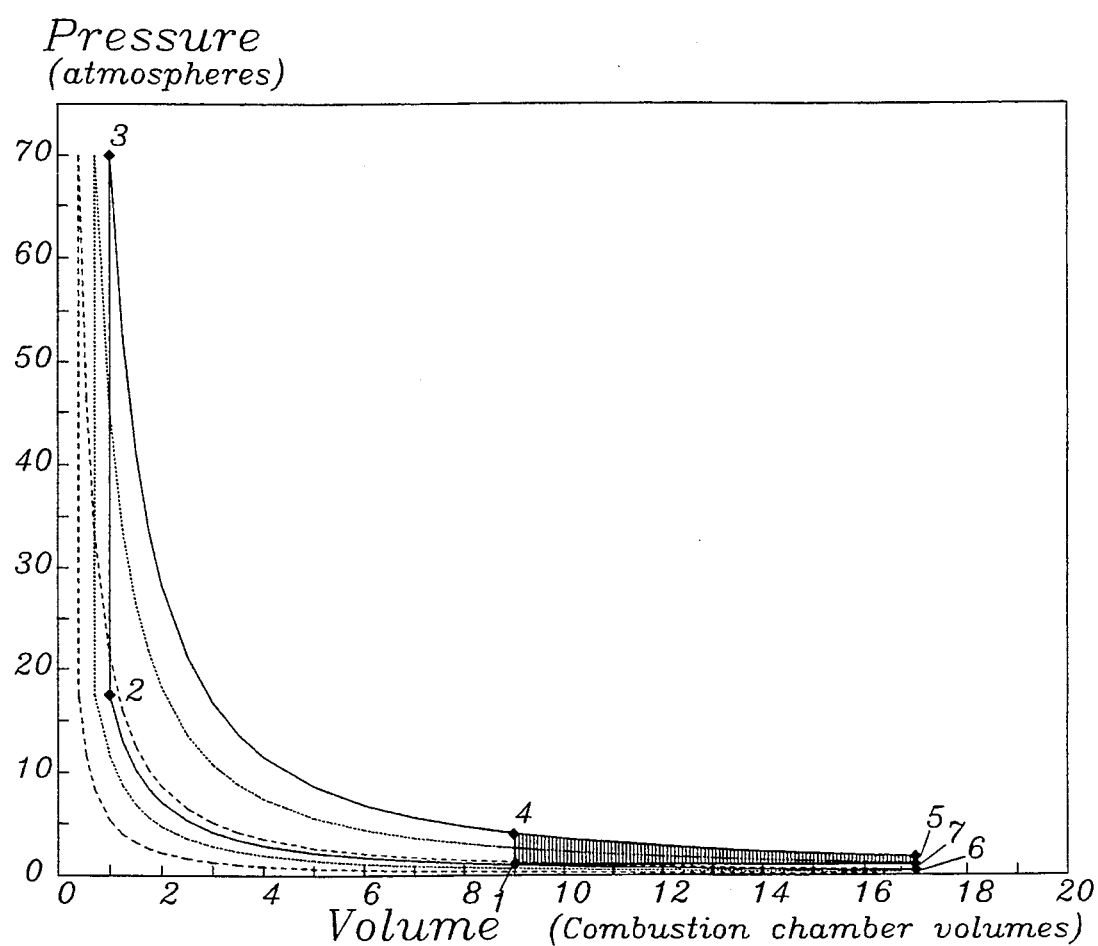
FIG. 2b is a pressure-volume graph showing the effect of the present invention at full throttle.

FIG. 2b includes a shaded area that shows the effect at full throttle of expanding the burned gases to twice the volume of a standard cycle. The area is enclosed by points 1-4-5-7-1. (Area 1-7-6-1 is not included as it represents the expansion work required to expand the mixture isentropically after the intake valve is closed, and is recovered during compression, with no net change in the pumping work.) The increase in area over the standard cycle is 15%. At the end of the extended expansion, the cylinder pressure is 1.8 atmospheres. Removing the idle area as an approximation of losses, results in an increase in area over the standard cycle of just over 20%

Figure 2C:
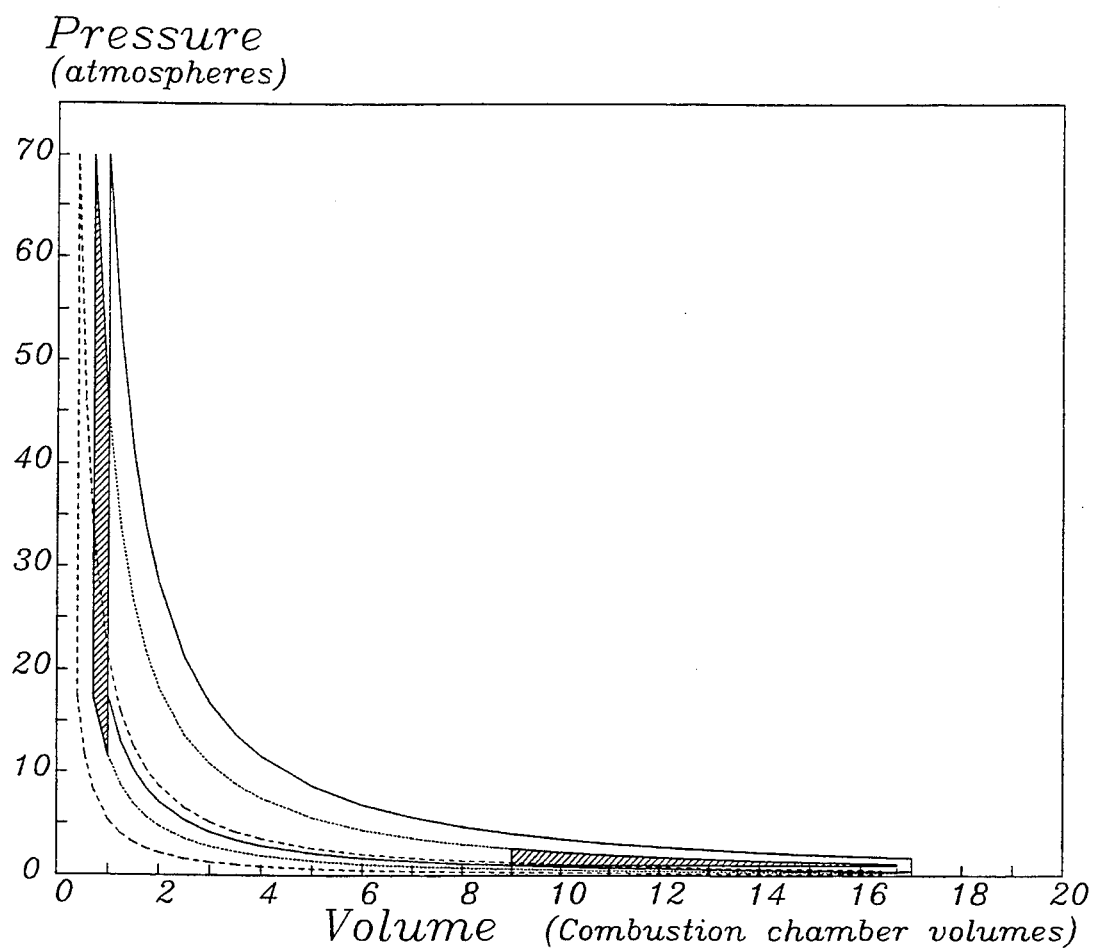
FIG. 2c is a pressure-volume graph showing the effect of the present invention at half throttle.

FIG. 2c includes shading for the increased area achieved at half load. The cylinder pressure at the end of the expansion stroke is 1.2 atmospheres. The combustion chamber volume is reduced here, and the contribution due to increasing the pre-combustion pressure is approximately 27% of the standard cycle area. The extended expansion increase is 11%, giving a combined increase of approximately 38%. Removing the idle area results in an increase of approximately 67% over the standard cycle.

Figure 2D:
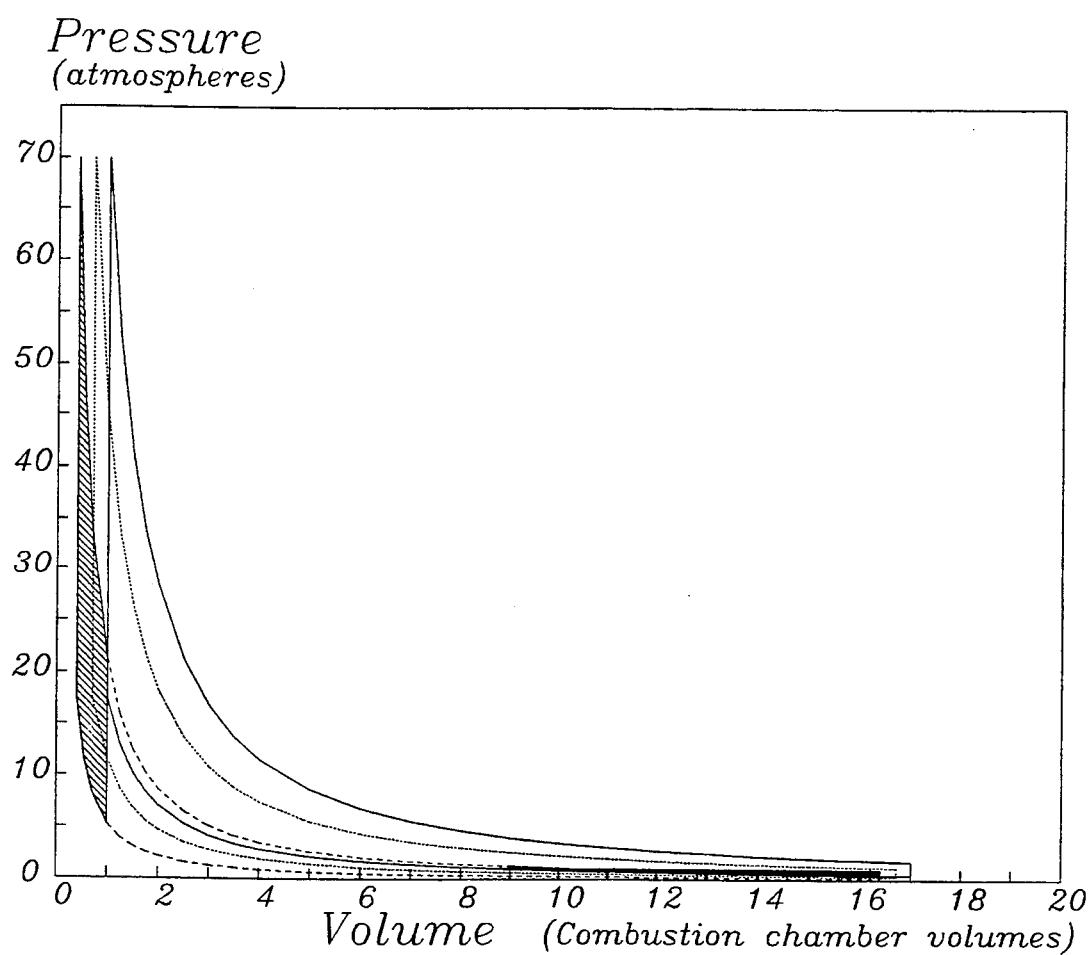
FIG. 2d is a pressure-volume graph showing the effect of the present invention at idle.

FIG. 2d includes shading for the increased area achieved at the original engine's idle level. The contribution from the variable volume combustion chamber is just over 80%, while the extended expansion process reduces the gains by 8%. (The indication here is that an expansion to compression ratio of 2:1 might be too high for general usage.) The cylinder pressure at the end of the expansion stroke falls to only 0.6 atmosphere, and thus some pumping work must be supplied to complete the expansion stroke. Comparing the area gain by removing the idle area of the standard cycle is meaningless. The benefit is that less fuel is required for the engine to maintain idle operation.

The ratio of expansion to compression chosen will depend on the intended usage of the engine. A larger ratio (closer to 3) will improve efficiency at high load levels, at the expense of reducing efficiency at low levels. A lower ratio (closer to 1) will increase the efficiency at light loads, but contribute little at high loads. As the quantity of fuel consumed increases with load levels, it is probable that a larger ratio would be preferable.

Figure 3:
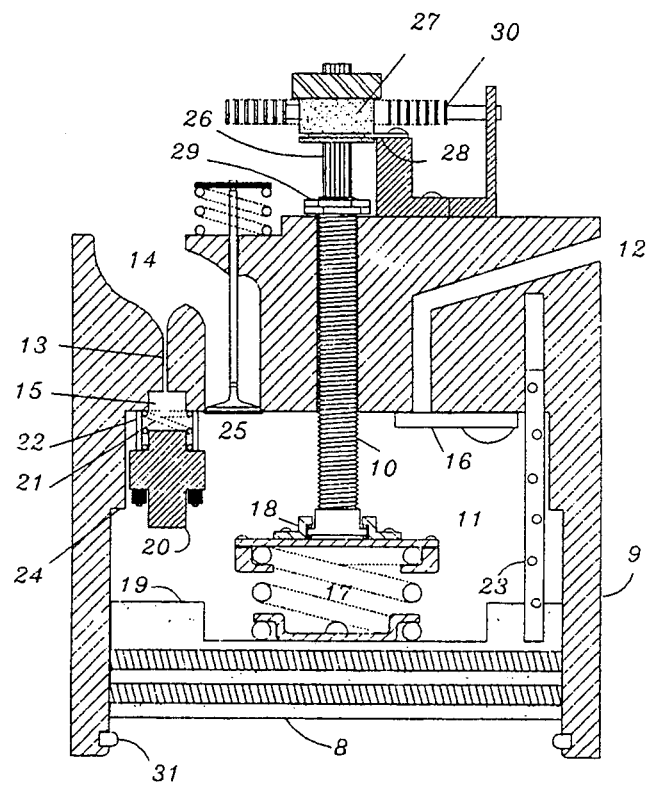
FIG. 3 shows a cross sectional view of an engine cylinder constructed in accordance with the present invention.

Varying the pre-combustion pressure throughout the operating range of an engine requires that the volume of the combustion chamber be altered dynamically. One embodiment to achieve this is shown in FIG. 3. An auxiliary piston 8, fitted with piston rings, slides within an auxiliary cylinder 9, located in the head of the engine. The position of the piston 8 is controlled directly by the adjustable rod 10, shown here as threaded. In response to the load on the engine, its temperature, and the mass of combustible mixture entering the cylinder, the necessary combustion chamber volume is calculated by the control electronics (such as the fuel injection control system), and the adjustable rod 10 is raised or lowered as required.

It is essential that the pressure of combustion acting on the auxiliary piston 8 is not transmitted to the adjustable rod 10, as this will cause damage to the thread, and/or the locating mechanism. Accordingly, the cavity 11 between the auxiliary piston 8 and the auxiliary cylinder 9 is filled with an incompressible, hydraulic fluid. (Engine oil is the preferable fluid, as it is readily available, and doesn't require a separate fluid circuit.) The hydraulic fluid must also provide cooling for the back side of the auxiliary piston 8, so there is an hydraulic fluid supply duct 12 leading into the chamber 11, and a long orifice 13 providing an exit passage from the chamber 11 to a small reservoir 14. The geometry of the long orifice is such that it allows a minimal circulation rate of hydraulic fluid at its supply pressure at all times that such a pressure is above the pressure in the working cylinder. The circular entrance 15 to the long orifice 13 is located at the highest point in the chamber 11, to allow venting of any blowby gases. A one-way check valve 16 on the hydraulic supply duct 12 prevents combustion pressure from causing back pressure in said supply. A spring 17 connects the piston 8 with the adjustable rod 10 to allow a small amount of relative movement between the two. The base of the adjustable rod 10 contains a rotatable bearing 18 to allow the adjustable rod 10 to rotate relative to the spring 17. The stiffness of the spring 17 is such that the hydraulic fluid supply will hardly move it, but when combustion pressures act on piston 8, and before the hydraulic fluid in the chamber 11 has reached equilibrium with those pressures, the spring 17 cushions the adjustable rod 10 from said pressures. The design of the long orifice 13 is such that a rapid increase in the pressure of hydraulic fluid causes no change in the discharge coefficient. Consequently, the increase in flow rate will be the square root of the ratio of peak pressures between the low pressure circulation, and peak pressure. This is a factor of approximately three.

By the time that the auxiliary piston 8 has moved a small fraction of the travel of the spring 17, the hydraulic fluid pressure in the chamber 11 will have risen to match the combustion pressure, relieving the spring load on the adjustable rod 10. The pressure in the working cylinder will subside to the point where no further fluid is discharged through the orifice 13. The hydraulic fluid supply then replaces the oil discharged. A small quantity will return from the reservoir 14 above the long orifice 13. The tapered exit to the orifice 13, plus the volume of hydraulic fluid in the small reservoir 14 will be sufficient to prevent the fluid from squirting out.

If piston 8 is retracted beyond the upper limit of its travel, a land 19 on said piston will push plug 20 against a spring 21. Guide posts 22 on which said plug slides ensure a close fit of said plug into the circular entrance 15 to the long orifice 13. Said plug 20 obstructs the entrance to the long orifice 13, and ensures a trapped cushion of hydraulic fluid, against which any combustion pressures would act. A hollow, perforated guide rod 23 ensures that the piston 8 is located precisely with respect to its orientation about the axis of the auxiliary cylinder 9. A land 24 machined into the auxiliary cylinder 9 wall prevents the auxiliary piston 8 from coming into a direct contact with the top of the auxiliary cylinder 9, or its components.

A purge valve 25 is provided for the case of a sudden increase in the load of the engine. When either the control system senses that the piston must be retracted more quickly than hydraulic fluid can be bled through the long orifice 13, or a knock sensor detects pre-ignition, said valve 25 is to be actuated by the control system to allow a free exit path for the fluid. (The actuation mechanism is not shown, but any suitable plunger will do.)

For actuation of the adjustable, threaded rod 10 by any rotating mechanism, the upper end may have a spline 26 machined axially. Slidable on this spline 26 would be a collar 27. Said collar 27 incorporates an internal spline to match that on the rod 26, and an external gear, driven by a means not shown. The slidable collar 27 is located by a tang 28. The adjustable rod 10 would be free to move up or down as the splined collar 27 rotated. A pair of lock nuts 29 provides fine adjustment for the innermost position of the auxiliary piston 8. Attached to the splined collar 27 is a spiral spring 30. The function of the spring is to provide torsion to rod 10 whenever the auxiliary piston 8 is lowered from its uppermost position.

A circlip 31 is shown located in a groove machined at the lower opening of the auxiliary cylinder 9. The purpose of the circlip is to prevent the auxiliary piston from falling into the working cylinder, in the event of a failure.

Operation of an engine with extended expansion of the Atkinson cycle can be achieved with a camshaft profile that closes the intake valve partway through the intake stroke. See FIG. 4. (Such early closure of the intake valve results in a decreased volumetric efficiency for the engine, but as the combustion chamber volume can be varied, the thermodynamic efficiency is affected very little.) Opening of the intake valve occurs in much the same manner as a standard engine. The exhaust valve is operated with essentially the same timing as for a conventional engine.

The operation of the engine is as follows. At start up, the auxiliary piston 8 is at its uppermost position in the auxiliary cylinder. As the engine fires, and the pressure of the hydraulic fluid increases to its working level, the auxiliary piston 8 is urged to a lower position, decreasing the combustion chamber volume, according to the engine load, temperature and air properties. As the load on the engine is increased, the adjustable rod 10 is rotated to bring the auxiliary piston back up to the desired position. If the load on the engine is increased too quickly for the long orifice 13 to allow hydraulic fluid to bleed out, the purge valve 25 is opened until the auxiliary piston 8 ceases its upward movement.

Within each 4-stroke cycle, the pressure of hydraulic fluid in the chamber 11 will vary from near that of the fluid supply, to something less than the peak combustion pressure in the combustion chamber. As the combustion pressure rises suddenly, the auxiliary piston 8 will be urged upwards, against the spring 17, and it will force the hydraulic fluid flow rate through the long orifice 13 to be increased. While the flow rate through the orifice 13 increases, so does the pressure in the chamber 11, cushioning the spring 17 from most of the force applied by the auxiliary piston 8. Within 45 degrees of crankshaft rotation (depending on the ratio of expansion to compression) the combustion pressure at full load will have fallen to a level close to that within chamber 11, then both will fall, and the discharge of hydraulic fluid through orifice 13 will decrease. As the pressure falls further, spring 17 will push the auxiliary piston 8 back to its original position, drawing hydraulic fluid back into chamber 11 from both the hydraulic supply duct 12, and also partly from the reservoir 14. During the compression stroke, the same protection of the adjustable rod 10 may be necessary.

Figure 4A:
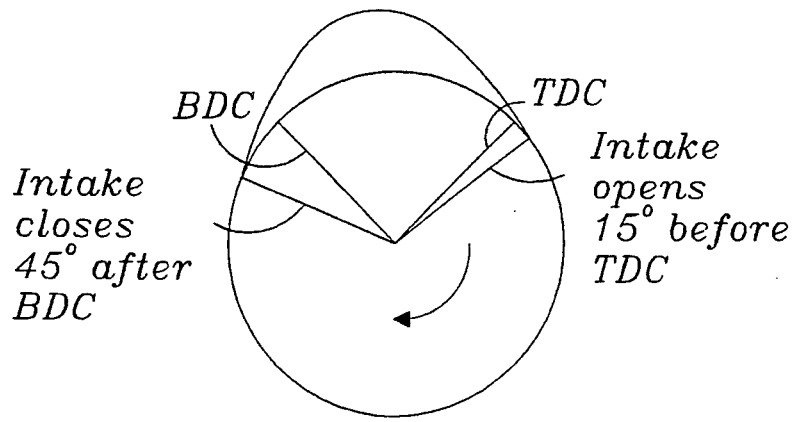
FIGS. 4a 4b show cam profiles for an ordinary engine and for an engine constructed in accordance with the present invention.
Figure 4B:
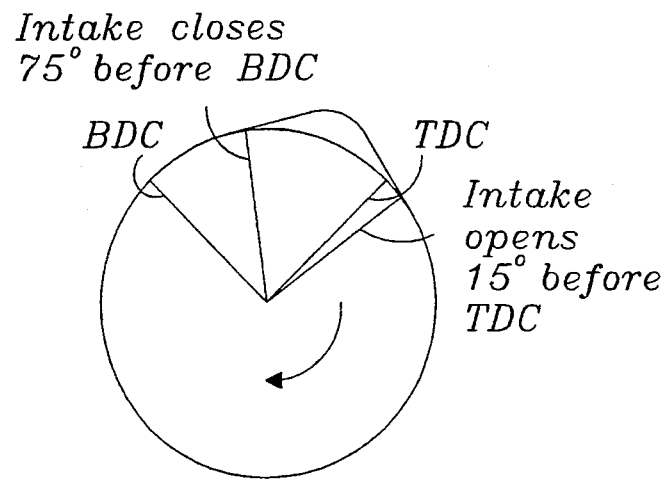
Figure 5:
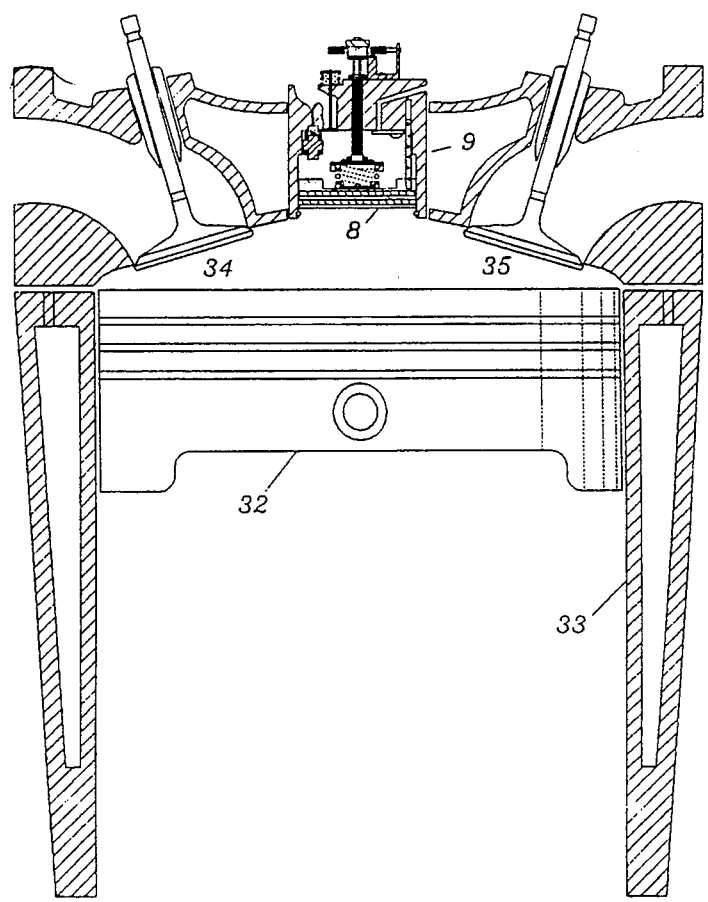
FIG. 5 shows a cross sectional view of a cylinder in accordance with another aspect of the present invention.

FIGS. 4a and 4b show cam profiles for both a standard 4-stroke engine plus a 4-stroke engine in which the cam is configured to close the intake valve prior to the piston reaching BDC. The camshaft (or camshafts) are in a conventional location, but are modified in profile as shown FIG. 5 shows a cross section of a 4-stroke engine incorporating the variable volume combustion chamber. The working piston 32 is shown in its cylinder 33, and the intake valve 34 and exhaust valve 35 are shown.

Figure 6A:
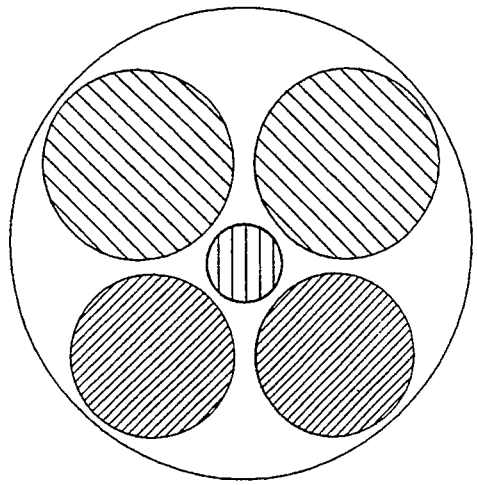
FIG. 6a and 6b shows the arrangement of spark plug and intake and exhaust valves in a cylinder head for a conventional engine, and the present invention.
Figure 6B:
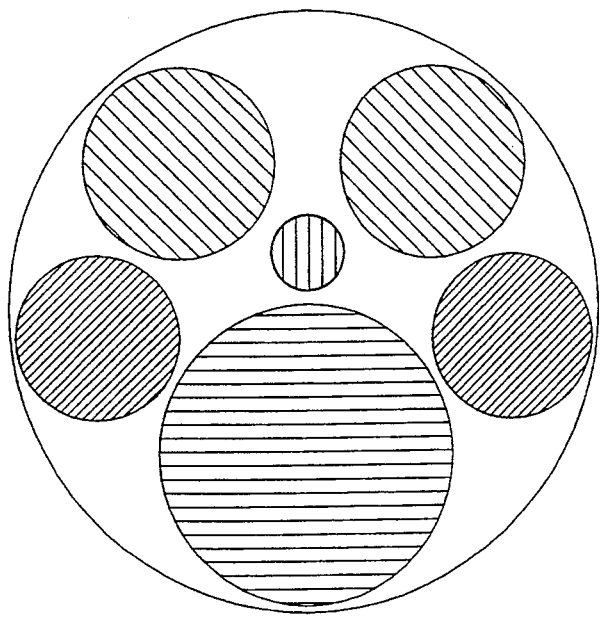

FIG. 6 demonstrates how the valve area occupied by a conventional engine is accommodated along with the auxiliary piston and cylinder, in an engine incorporating both a variable volume combustion chamber, and the Atkinson cycle. In this diagram, the view of the combustion chamber in FIG. 6a shows (schematically) the head of a modern, four-valve engine whose cylinder has an 86 mm bore (from a fictitious 4 cylinder, 2-liter engine), with an 86 mm stroke, a square design. The combustion chamber incorporates two 35 mm intake valves, and two 30 mm exhaust valves. The ignitor is centrally located. The combustion chamber in FIG. 6b is for a 110 mm bore by 105 mm stroke engine (a 4-liter, 4 cylinder engine). It includes the same size valves as in the combustion chamber on the left, as well as a 55 mm diameter auxiliary piston. (The stroke of the auxiliary piston would be approximately 15 mm for a conventional 9:1 volumetric compression ratio.) For a standard expansion to compression ratio (1:1), there is difficulty in arranging the valves and auxiliary cylinder in the space available although a considerably oversquare design could achieve this.

While only a 4-stroke, reciprocating piston, spark ignition engine has been shown here, the invention is equally applicable to 4-stroke rotary and orbital engines.

Figure 7:
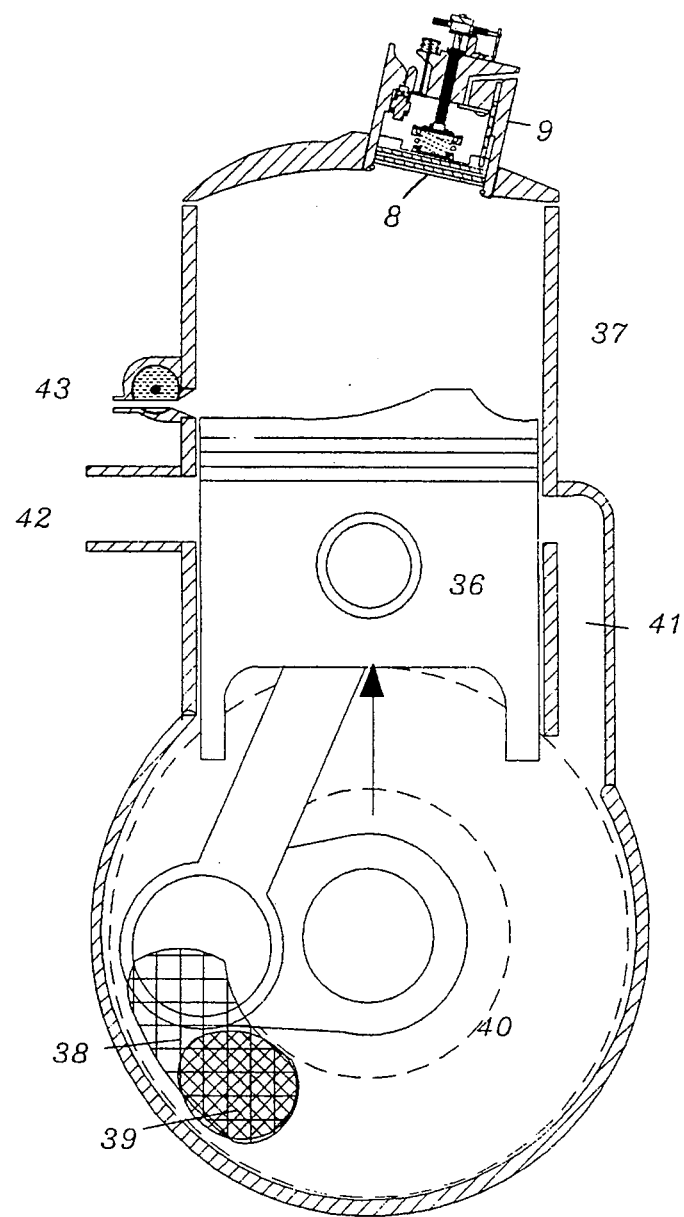
FIG. 7 shows a two-stroke engine in accordance with the present invention.

The application of the variable volume combustion chamber to 2-stroke engines is achieved in the same manner as described above. Implementation of the Atkinson cycle is achieved differently, due to the hurried nature of gas exchange in 2-stroke engines FIG. 7 shows schematically how the invention might be applied to a crankcase compression, rotary valve induction engine. The working piston 36 slides in cylinder 37. During the ascent of the piston 36, the combustible mixture is compressed above it. Beneath the piston, air is inducted through ports in the crankcase housing 38 and the rotary valve 39, into the crankcase chamber 40. The desired scavenging ratio may be determined by the appropriate expansion to compression ratio, and the area and duration of the intake ports 38, 39. It is possible that the intake ports will be covered prior to the piston reaching top dead center (TDC), causing an approximately isentropic expansion of the inducted air. (As for the 4-stroke induction stroke, this pumping work is recovered as the piston 36 descends.) Meanwhile, above the piston 36, combustion will have occurred by TDC, and the piston 36 will begin its descent on the power stroke, while simultaneously compressing the gases inducted into the crankcase chamber 40. (The position of the auxiliary piston 8, to vary the volume of the combustion chamber, will have been determined by the load settings, and engine parameters.)

As the piston 36 approaches bottom dead center (BDC), first the exhaust port 42 is uncovered, allowing the burned gases to expand to the pressure of the exhaust system, and very soon thereafter, the transfer port 41 is uncovered, allowing the compressed air beneath the piston 36 to displace most of the remaining burned gases. The piston 36 begins to rise again, covering both the transfer and exhaust ports. At this stage, an auxiliary, rotary air bleed valve 43 is opened in the cylinder wall. It is connected to the intake manifold to the crankcase. The purpose of this valve 43 is to allow a portion of the air introduced in the cylinder 37 to be removed, in much the same way that early closing of the intake valve in the 4-stroke example limits the mass of gas into the cylinder. The position of this valve 43 will be determined by the desired expansion to compression ratio. (The auxiliary valve 43 is not open on the power stroke, due to the offset location of the outlet passage. This allows the piston 36 to expand beyond the standard length, achieving extended expansion.) As soon as the piston 36 seals the auxiliary bleed port, fuel is injected directly, and the compression and combustion processes take place. The cycle is then repeated.

Different configurations of 2-stroke engines abound. The characteristics required to achieve the aforementioned advantages claimed by this invention are: the variable volume combustion chamber, detailed above, and a means to vent a portion of the intake air back to the intake manifold prior to the compression stroke. The vent may be a valve in the head of the engine that communicates with the intake manifold.

What is claimed is:

1. An assembly for varying the combustion chamber volume in an internal combustion engine, comprising a housing with a chamber in communication with the combustion chamber; a piston slidably and adjustably extending into the housing chamber to adjust the volume of the combustion chamber; a hydraulic chamber containing hydraulic fluid, substantially enclosed by the piston and the housing on the opposite side of the piston from the combustion chamber, the hydraulic chamber having a hydraulic fluid channel extending from inside the hydraulic chamber to outside the hydraulic chamber to allow limited release of hydraulic fluid therethrough upon an increase in the pressure in the hydraulic fluid, and a hydraulic fluid port from inside the hydraulic chamber to outside the hydraulic chamber, the hydraulic port having an operable valve to open and close it and being sized substantially larger than the hydraulic fluid channel to allow a flow rate substantially greater than the flow rate through the hydraulic flow channel.

2. The assembly of claim 1, wherein the hydraulic chamber further includes a hydraulic fluid inlet from outside the hydraulic chamber to inside the hydraulic chamber, the hydraulic fluid inlet being sized substantially larger than the hydraulic fluid channel to allow a flow rate substantially greater than the flow rate through the hydraulic fluid channel.

3. The assembly of claim 2, wherein the hydraulic fluid inlet has a one-way valve positioned therein so that hydraulic fluid can flow only into the hydraulic chamber through the inlet.

4. An assembly for varying the combustion chamber volume in an internal combustion engine, comprising a housing with a chamber in communication with the combustion chamber; a piston slidably and adjustably extending into the housing to adjust the volume of the combustion chamber; a screw extending through the housing, the longitudinal axis of the screw being parallel to the sliding axis of the piston; screw drive means; means to connect the screw to the piston; and a hydraulic chamber containing hydraulic fluid substantially enclosed by the piston and the housing on the opposite side of the piston from the combustion chamber to lessen the force of the piston on the screw upon combustion in the combustion chamber.

5. The assembly of claim 4, wherein the screw drive means includes geared wheel on the screw.

6. The assembly of claim 4, wherein the connect means includes a spring between the screw and the piston to absorb part of the combustion pressure on the piston.

7. The assembly of claim 4, further comprising limiting means for limiting the slide of the piston in the housing.

8. The assembly of claim 7, wherein the limiting means includes a closure on the hydraulic chamber side of the piston to mate with and close the hydraulic fluid channel when the piston is slid a predetermined distance into the hydraulic chamber.

9. The assembly of claim 8, wherein the hydraulic fluid channel is in a wall of the housing opposite the piston, and the closure includes a plug to mate with the channel that is positioned outside the channel and urged toward the piston by a spring.

10. The assembly of claim 7, wherein said limiting means includes a land in the housing wherein the housing on the piston side of the hydraulic chamber extends in the direction radial from the axis of piston travel a first distance and a second distance, the first distance being greater than the second distance, and the first distance and second distance having a land between them to stop the piston from travelling past the land toward the hydraulic chamber wall opposite the piston.

11. The assembly of claim 7, wherein the limiting means includes means for limiting the slide of the piston away from the hydraulic chamber and into the combustion chamber.

12. The assembly of claim 11, wherein said means for limiting the slide of the piston away from the hydraulic chamber and into the combustion chamber includes a stop on the housing on the combustion chamber side of the piston extending from the housing into the path of travel of the piston.

13. The assembly of claim 12, wherein said stop is a ring.

14. An assembly for varying the combustion chamber volume in an internal combustion engine, comprising a housing with a chamber in communication with the combustion chamber, a piston slidably and adjustably extending into the housing to adjust the volume of the combustion chamber; a hydraulic chamber containing hydraulic fluid, substantially enclosed by the piston and the housing on the opposite side of the piston from the combustion chamber, the hydraulic chamber having a hydraulic fluid channel extending from inside the hydraulic chamber to outside the hydraulic chamber to allow limited release of hydraulic fluid therethrough upon an increase in the pressure in the hydraulic fluid; and means for limiting the skew of the piston including a perforated hollow rod, one end of which is attached to the hydraulic chamber side of the piston and the other end of which is slidably mounted in the housing wall opposite the piston.

15. A four-stroke internal combustion engine, comprising a cylinder; a working piston reciprocally mounted in the cylinder; a set of valves to control gas flow into and out of the cylinder, including an intake valve; means for operating the valves in timing with the reciprocation of the piston, whereby compressed gas in a combustion volume in the cylinder is ignited and expands to drive the piston through a power stroke and is then exhausted to outside the cylinder, and whereby the intake valve is closed before the piston completes the intake stroke; and means to vary the combustion volume by the insertion of a member into the cylinder.

16. The engine of claim 15, wherein the volume-varying means is a volume varying piston slidably mounted in the cylinder in communication with the combustion volume.

17. The engine of claim 15, wherein the gas entering the cylinder includes gaseous fuel, and further comprising a throttle in communication with the cylinder to adjust the amount of fuel entering the cylinder.

18. The engine of claim 17 wherein the means to vary the combustion volume by the insertion of a member into the cylinder operates to decrease the combustion volume at low throttle and to increase the combustion volume at high throttle.

19. The engine of claim 17, wherein the intake valve is closed before the piston completes the intake stroke at all throttle positions.

20. The engine of claim 19, wherein the intake valve timing is fixed.

21. A two-stroke internal combustion engine, comprising a cylinder; a set of at least one of valves and parts to control gas flow into and out of the cylinder; means for operating the at least one of valves and parts in timing with the reciprocation of the piston, whereby compressed gas in a combustion volume in the cylinder is ignited and expands to drive the piston through a power stroke and is then exhausted to outside the cylinder, and whereby some the intake gas in expelled prior to combustion; and means to vary the combustion volume by the insertion of a member into the cylinder.

22. The engine of claim 21, wherein the valves include a bleed valve to allow the escape of same of the gas from the cylinder prior to combustion.

23. The engine of claim 22, wherein the bleed valve bleeds gas from the cylinder to the compression chamber or intake manifold.

24. A method of operating a four-stroke internal combustion engine having a cylinder, a working piston reciprocally mounted in the cylinder, a set of valves to control gas flow into and out of the cylinder, and means for operating the valves in timing with the reciprocation of the piston whereby gas is compressed by the piston to a combustion volume and is ignited and expands to drive the piston through a power stroke and is then exhausted to outside the cylinder, the method comprising closing the intake valves before the piston reaches the bottom of the intake stroke; and adjusting the combustion volume based on the throttle position of the engine, whereby the combustion volume is reduced for low throttle.

25. The method of claim 24, wherein said step of adjusting of the combustion chamber volume includes adjustably inserting a member into the combustion chamber.

26. The method of claim 5, wherein said member is volume adjusting piston slidably mounted in a housing attached to the cylinder, the volume adjusting piston and housing enclosed a hydraulic fluid chamber to cushion the pressure exerted on the volume adjusting piston by the combustion of gases in the cylinder.

27. The method of claim 26, further comprising controllably allowing hydraulic fluid to be expelled from the hydraulic fluid chamber upon the exertion of pressure on the volume-adjusting piston by the combustion of gases in the cylinder, and controllably replacing said expelled hydraulic fluid upon the termination of such combustion pressure.

28. The method of claim 27 wherein said controlling of expulsion and replacement of hydraulic fluid includes the use of a bleed channel from the hydraulic chamber to outside the hydraulic chamber for hydraulic fluid to pass through.

29. The method of claim 28, wherein the adjustment of said volume adjusting piston is by turning a screw one end of which is attached to the piston and the other end of which is threaded through the housing.

30. The method of claim 29, further comprising absorbing a portion of the combustion pressure on the volume-adjusting piston with a spring between the screw and the piston.

31. The method of claim 28, further comprising abruptly draining the hydraulic chamber to accommodate abrupt withdrawal of the volume-adjusting piston into the hydraulic chamber, by opening a hydraulic fluid port having a size substantially larger than the size of the hydraulic fluid bleed channel to allow the passage of hydraulic fluid therethrough substantially faster than through the hydraulic fluid bleed channel.

32. A method of operating a two-stroke internal combustion engine having a cylinder, a working piston reciprocally mounted in the cylinder, a set of valves to control gas flow into and out of the cylinder, and means for operating the valves in timing with the reciprocation of the piston whereby gas is compressed by the piston to a combustion volume and is ignited and expands to drive the piston through a power stroke and is then exhausted to outside the cylinder, the method comprising expelling a portion of the intake gas prior to combustion; and adjusting the combustion volume based on the throttle position of the engine whereby the combustion volume is reduced for low throttle.

33. The method of claim 32, wherein the expulsion of intake gas is through a bleed valve from the cylinder to the intake manifold or compression chamber.

* * * * *